(12) United States Patent
Gordon et al.

(10) Patent No.: US 6,220,498 B1
(45) Date of Patent: Apr. 24, 2001

(54) APPARATUS AND METHOD FOR WELDING AND INSPECTING COILED TUBING

(75) Inventors: Alec Gordon; Ashley Thomson, both of Edinburgh (GB)

(73) Assignee: Agais Offshore Limited, Edinburgh (GB)

( * ) Notice: Subject to any disclaimer, the term of this patent is extended or adjusted under 35 U.S.C. 154(b) by 0 days.

(21) Appl. No.: 09/355,005

(22) PCT Filed: Jan. 21, 1998

(86) PCT No.: PCT/GB98/00177

§ 371 Date: Aug. 6, 1999

§ 102(e) Date: Aug. 6, 1999

(87) PCT Pub. No.: WO98/31499

PCT Pub. Date: Jul. 23, 1998

(30) Foreign Application Priority Data

Jan. 21, 1997 (GB) .................................................. 9701161

(51) Int. Cl.[7] .............................. B21D 39/00; B23K 1/20; B23K 37/00
(52) U.S. Cl. ...................... 228/173.4; 228/44.5; 228/49.3
(58) Field of Search .............................. 228/173.4, 44.5, 228/212, 49.3; 219/60 A, 72

(56) References Cited

U.S. PATENT DOCUMENTS

| | | | |
|---|---|---|---|
| 3,641,777 | 2/1972 | Banjavich et al. ........................ | 61/69 |
| 3,658,231 | * 4/1972 | Gilman .................................... | 228/4 |
| 3,775,586 | * 11/1973 | Flint et al. ........................ | 219/121 L |
| 3,876,852 | * 4/1975 | Topham ................................ | 219/72 |
| 3,965,713 | * 6/1976 | Horton .................................. | 72/146 |
| 4,035,602 | * 7/1977 | Berghof .............................. | 219/72 |
| 4,055,989 | * 11/1977 | Henry, Jr. et al. ...................... | 73/588 |
| 4,105,887 | * 8/1978 | Marshall et al. ........................ | 219/72 |
| 4,528,436 | * 7/1985 | Stol ......................................... | 219/74 |
| 4,538,937 | * 9/1985 | Lynch ................................... | 405/168 |
| 4,629,218 | 12/1986 | Dubois ................................. | 285/176 |
| 4,654,500 | * 3/1987 | Stiles et al. ............................. | 219/72 |
| 5,583,305 | * 12/1996 | Hirsch et al. ........................ | 73/865.8 |
| 5,986,236 | * 6/1998 | Gainand et al. ................. | 219/121.82 |

FOREIGN PATENT DOCUMENTS

| | | |
|---|---|---|
| 1 337 553 | 11/1973 | (GB) . |
| 1 494 409 | 12/1977 | (GB) . |
| 1 545 617 | 5/1979 | (GB) . |

OTHER PUBLICATIONS

Derwent Publication, XP002064119, Kiev Work Hygiene –Mosc Mains Pipes, Jul. 7, 1988.

Derwent Publication SU–645801–A, L.A. Yankovskii –Volga–Don Boiler DE, Sep. 29, 1977.

* cited by examiner

*Primary Examiner*—Clifford C. Shaw
*Assistant Examiner*—L. Edmondson
(74) *Attorney, Agent, or Firm*—Ratner & Prestia

(57) ABSTRACT

An apparatus and method for use in welding together sections of coiled tubing (6) in the oil industry, wherein the apparatus has a container (14), legs (12) which can be adjusted to adjust the height of the container (14), welding apparatus in the container and slots in the walls of the container. In use the container is raised to the height of the coiled tubing which is to be joined. A winch pulls the ends of the coiled tubing towards a clamp, which holds the two ends of the coiled tubing fixed inside the container, while the ends are welded together. The slots in the walls allow the joined tubing to pass out of the container after the weld is completed. The container provides a controlled environment for welding and weld inspection.

10 Claims, 15 Drawing Sheets

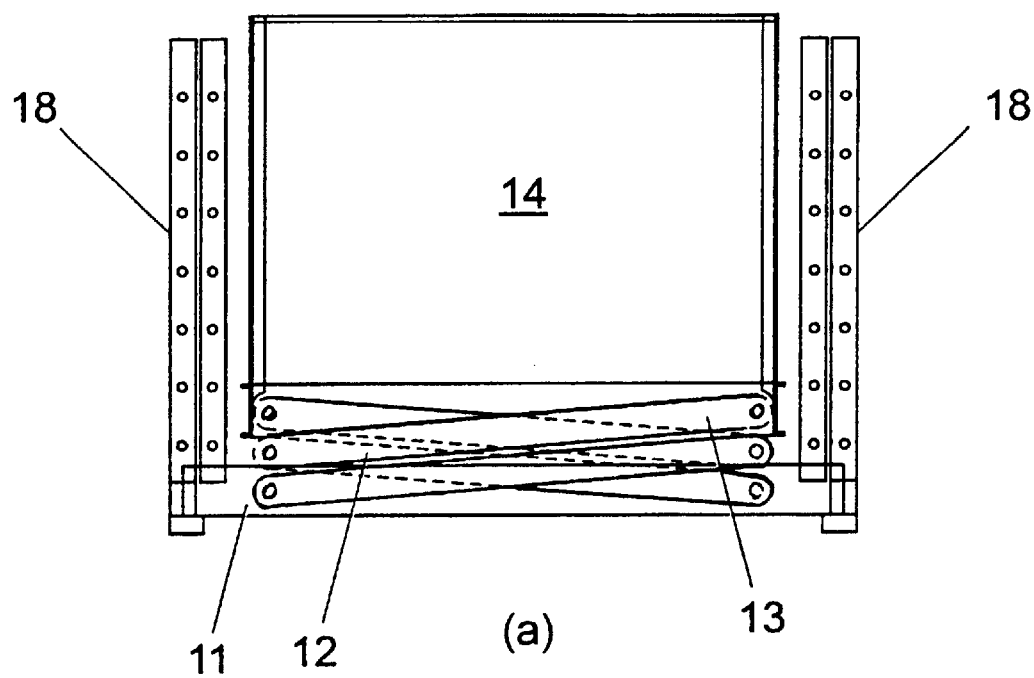
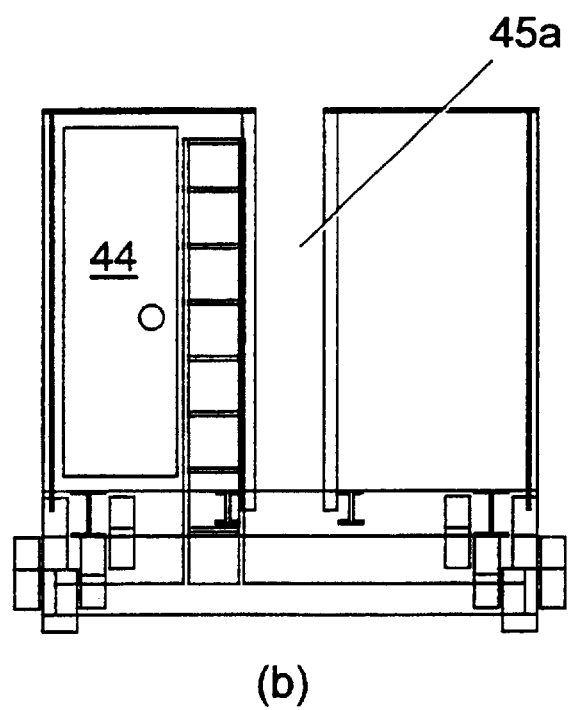
Fig. 18

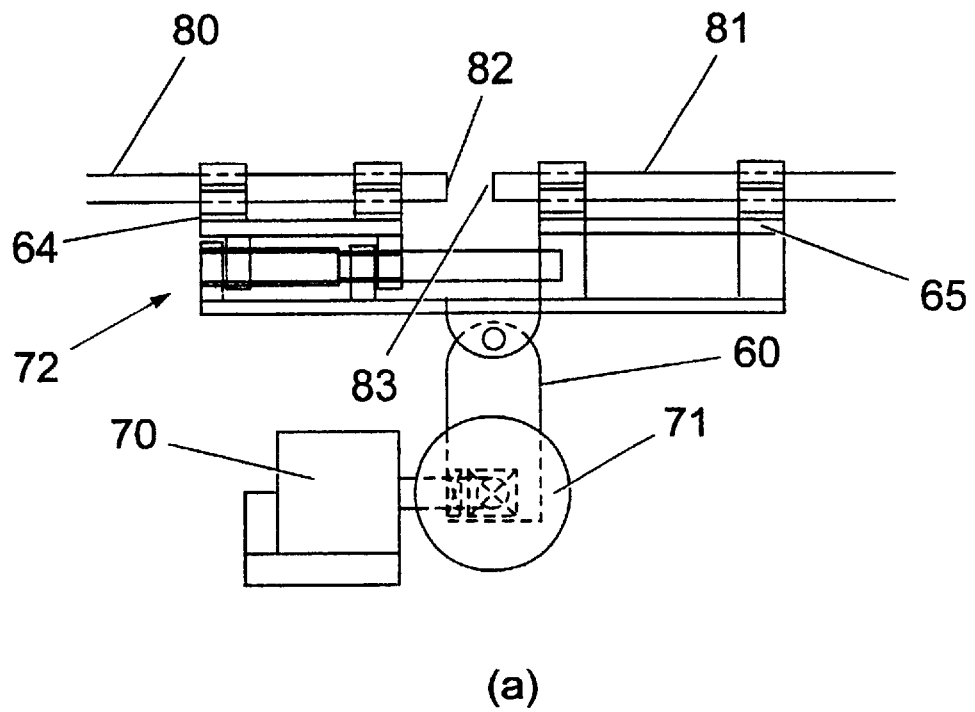
(a)
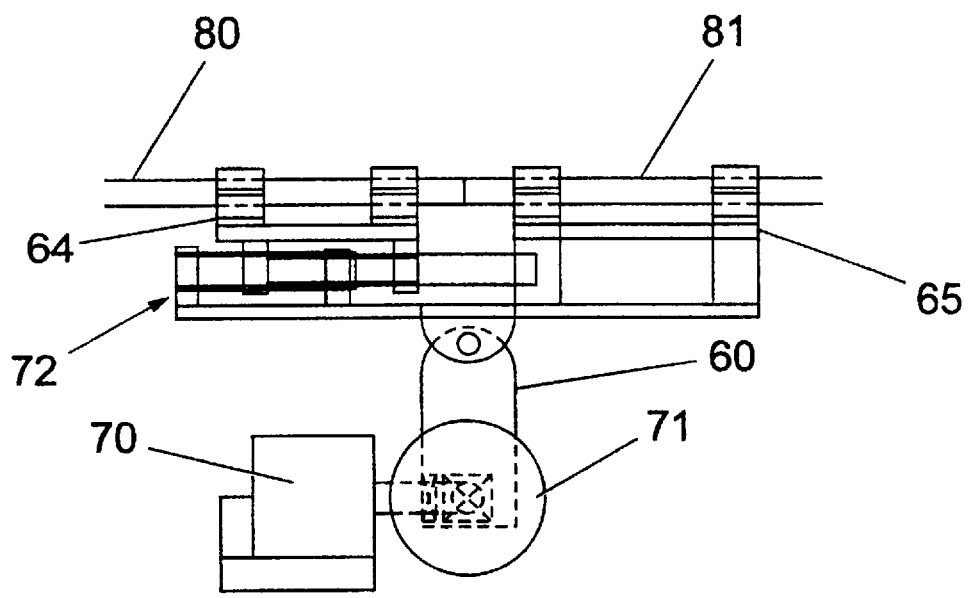
(b)
*Fig. 20*

APPARATUS AND METHOD FOR WELDING AND INSPECTING COILED TUBING

Coiled tubing is used in the oil well industry. Coiled tubing (C.T.) is handled using C.T. units.

The C.T. unit (illustrated in FIG. 1) is a hydraulically-powered transportable system including the following main components:

Tubing injector head 1 and tubing guide 91

Tubing reel 2 with counter 92

Blow-out preventer stack 3

Hydraulic power skid 4

Control console 5 connected to power pack 90

Such C.T. units are known in the prior art.

The coiled tubing 6 itself is a continuous tube presently available in diameters from 25 mm (1") up to 168 mm (6 ⅝") and available in materials ranging from the most common material which is A606 Type 4, modified High Strength Low Alloy Steel to Titanium, which is less commonly used to date.

This continuous length of steel tubing is wrapped onto reels ranging in diameter from 2.3 m (90") to 5.2 m (204") or more.

During operation the tubing is fed over the tubing guide 1, through the hydraulic drive tubing injector 4, down through the blow out preventer 3 and into the well head.

The flexibility of C.T. operations in terms of application, cost, rig set up time an the ability to remove a tubing string from one well and reuse it in another gives C.T. an unrivalled attraction to platform operators. C.T. is now being used more frequently to drill new wells, both vertical wells and wells which require the C.T. at certain depths to deviate towards the horizontal, otherwise known as directional drilling or deviated wells, at depths of up to 8000 m (25,000 feet) but can also be used in many other applications, such as:

Nitrogen Lifts

Acidising

Well Cleanouts

Cementing

Fishing

Logging

Drilling

Velocity Strings

Production Strings

Pre-perforated Liners

Gas Lifts

Gravel Packing etc

New applications for C.T. are being explored constantly as new down hole tools are designed and new and better C.T. materials are developed.

C.T. only really began to take off in the 1980s as great improvements were made to the reliability of the technology.

The real catalyst came in the mid 1980s when the oil price crashed to $10 per barrel. C.T. was shown to cut costs by 50–85% over conventional rig operation using a drilling derrick.

During normal operating the C.T. sometimes has to be cut to remove a damaged length of pipe. In the case of very deep wells one length of tubing, say 3000 m (10,000 feet), may have to be joined to another length of 3000 m (10,000 feet) to make a 6000 m (20,000 feet) string of C.T.

The job of cutting and re-welding the C.T. together in a hostile environment is not straightforward and can present practical problems.

At present the normal practice is to refrain from cutting the C.T. unless absolutely necessary and, if welding is required, the welder does the best he can, making sure high quality control standards are used. The reason for this is that C.T. butt welds must be completely defect free. Onshore in a dry, well lit, draught free fabrication shop, with the welder having to be elevated to get at the C.T. it is a complex operation.

However in on-site conditions, such as in the desert at +40° C. with high winds or on an offshore platform at −20° C. in heavy weather it is very much more difficult. It can take as much as 10 days to complete a C.T. welding operation in a hostile environment.

At present the main reason for trying to avoid cutting and re-welding coiled tubing is because the C.T. has a residual bend in it when taken off the reel, i.e. if a piece a metre long is cut and placed on the floor, it forms an arc. If the same is done with another piece and the two pieces are welded together, a dog-leg in the C.T. string can be created, as illustrated in FIG. 2.

This dog-leg 7 created during the welding operation creates a weak point in the continuous C.T. string which can and does result in the tubing failing at this point. The perfect weld can only be achieved by welding a substantially straight length of tubing to another substantially straight length of tubing, with the operation being carried out in a well lit, dry stable environment, free of draughts, with good ventilation and an ambient temperature of around 20° C.

There exists a requirement for an apparatus which will provide such conditions in any environment in which coiled tubing operations are carried, such that coiled tubing can be welded in a fraction of the time currently taken, at a reduced direct cost and at the highest standard possible.

There exists a requirement that such apparatus will be completely transportable and self contained, such that it can be transported to the site of the C.T. operations, kept there for the duration of the operations, and then removed to another site.

It is an object of the present invention to provide an apparatus and method which will provide controlled conditions for the welding and inspection of coiled tubing joints in any environment in which coiled tubing operations are carried out.

According to a first aspect of the present invention there is provided a portable unit for on-site welding operations comprising a container for carrying out welding operations therein, a tube clamping means and welding apparatus, said container having a roof, two opposing side walls and at least one door therein.

Preferably the container comprises a slot in each of said opposing walls, each of said slots being adapted to allow the passage of a tube extending through said wall and clamped by said clamping means, such that said tube may move relative to said container. Said slots may be substantially horizontal and extend to an opening in an end wall of said container. Alternatively said slots may be substantially vertical and extend to a further slot provided in said roof.

Preferably the unit comprises means for adjusting the height of said container, most preferably height adjustable legs.

Preferably the tube clamping means is adapted to clamp two sections of tubing in abutting end to end relationship. Preferably the tube clamping means comprises a moveable clamp assembly adapted to hold and move a first one of said sections of tubing axially into abutting end to end relationship with a second one of said sections of tubing. Preferably the tube clamping means further comprises a fixed clamp assembly adapted to hold the second section of tubing.

The unit may comprise a first guide means adapted to guide the tube clamping means between a first position outside the container and a second position inside the container.

The unit may further comprise a tube straightening means. The unit may further comprise a second guide means adapted to guide the tube straightening means between a first position outside the container and a second position inside the container. Preferably the first guide means is operable independently from the second guide means.

Preferably the container comprises a door which is retractable over said opening. The door may be a sliding door, a roller shutter door or other door, and may be adapted to seal the container when the tube clamping means is in said second position inside the container.

The tube straightening means may comprise two drive belts arranged such that a first driving surface of the first belt is opposed and parallel to a second driving surface of the second belt and is spaced therefrom, the first driving surface having a convex shape in the drive direction and the second driving surface having a concave shape in the drive direction.

Preferably both the first and second driving surfaces have a concave shape perpendicular to the drive direction.

Preferably each drive belt is arranged on a jaw member, the jaw members being operable between an open position, in which a tube member may be inserted between the first and second driving surfaces, and a closed position, in which the first and second driving surfaces clamp a tubular member positioned therebetween.

Preferably the tube straightening means is pivotally connected to the second guide means and can pivot between an operating position in which the drive direction is aligned with the clamping means and a non-operative position in which the drive direction is not aligned with the clamping means. Preferably the unit comprises two tube straightening means pivotally connected such that in the operating position the drive directions of both tube straightening means are aligned with each other.

According to a second aspect of the present invention there is provided a method of joining coiled tubing comprising the steps of:

uncoiling a first portion of coiled tubing,
uncoiling a second portion of coiled tubing,
moving the first and second portions into an at least partially enclosed space,
holding the first and second portions in a clamping means in a position such that the end of the first portion abuts or is close to the end of the second portion,
forming a welded connection between said first and second portions within said space,
removing the connected first and second portions from said space.

The method may include the step of straightening the coiled tubing before clamping it. Preferably the straightening step is achieved by bending the coiled tubing with a reverse curvature opposite to that which it had when coiled. Preferably the amount of reverse curvature is selected such that after bending with the reverse curvature the tubing relaxes elastically to adopt a substantially straight shape. Preferably the tubing retains a reverse plastic deformation after the straightening step.

Preferably the method includes the step of substantially enclosing the at least partially enclosed space before welding. Preferably the space comprises the interior of a container.

Preferably the container comprises one or more slots to permit the passage of the connected sections of coiled tubing from the container in a direction substantially perpendicular to the longitudinal axis of the coiled tubing at the connection.

The method may further comprise one or more of the following steps:

driving the first and second portions of tubing towards each other when clamped until the end of the first portion abuts or is close to the end of the second portion,
applying heat removal clamps to the first and second portions of tubing before welding,
inspecting the weld using weld inspection apparatus, such as X-ray, ultrasonic or eddy current equipment.

Thus the invention provides in one embodiment a fabricated container which is well lit and air conditioned, so as to provide both adequate ventilation for the welder or operator and a controlled environment for the welding operation. The coiled tubing and the welder/operator are housed within a dry, draught free environment, which is a prerequisite for a high quality weld.

The invention provides the environmental conditions and physical requirements to perform an automated weld to join tubing strings in a hostile external environment. The automated weld can be performed using an orbital welding head which will produce a weld of superior quality, reliability and repeatability in comparison to a manual butt weld.

An embodiment of the invention will now be described, by way of example only, with reference to the accompanying figures, where:

Figure 4:
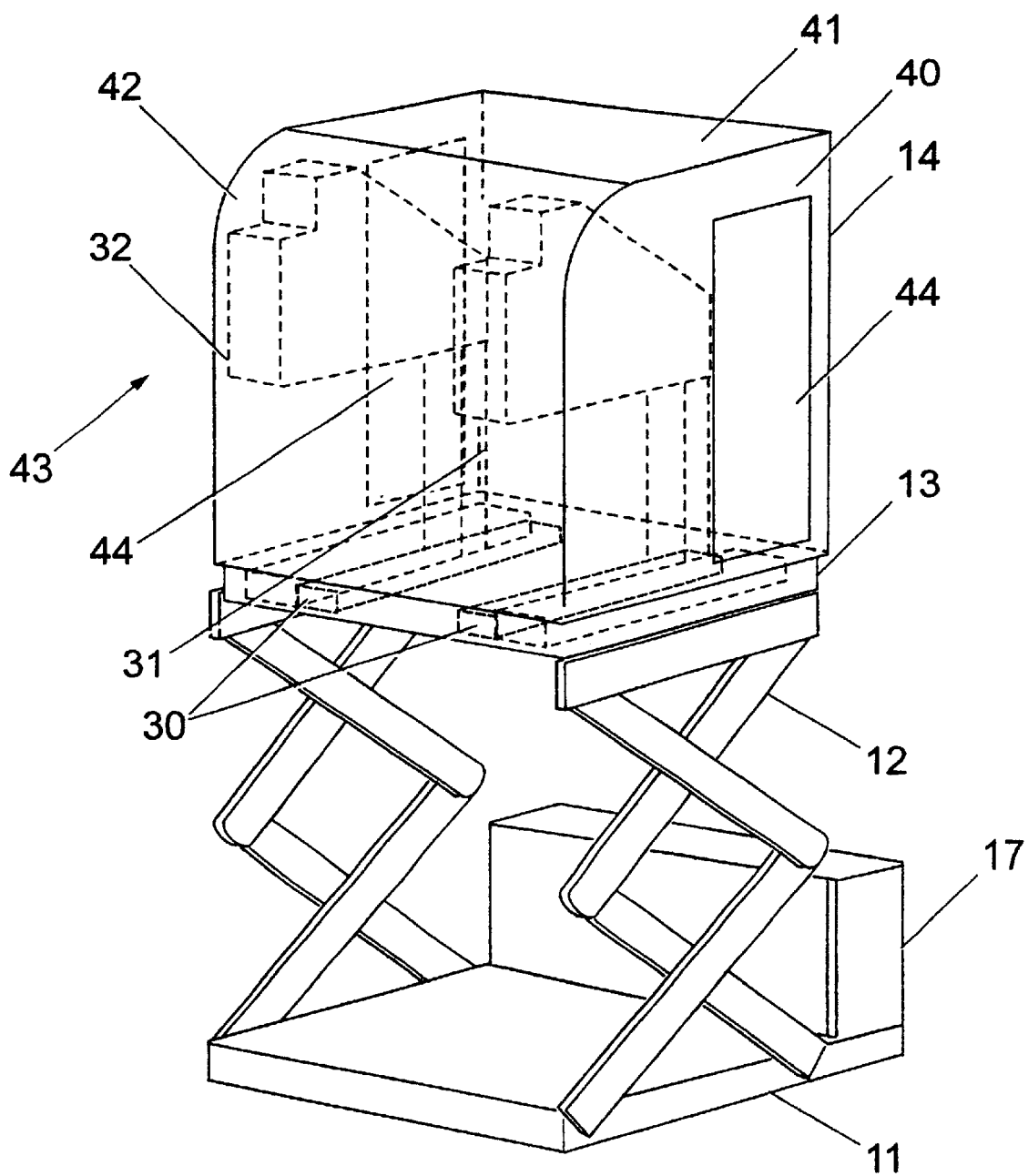
FIG. 4 is an isometric view of an apparatus according to a first embodiment of the invention.
Figure 5A:
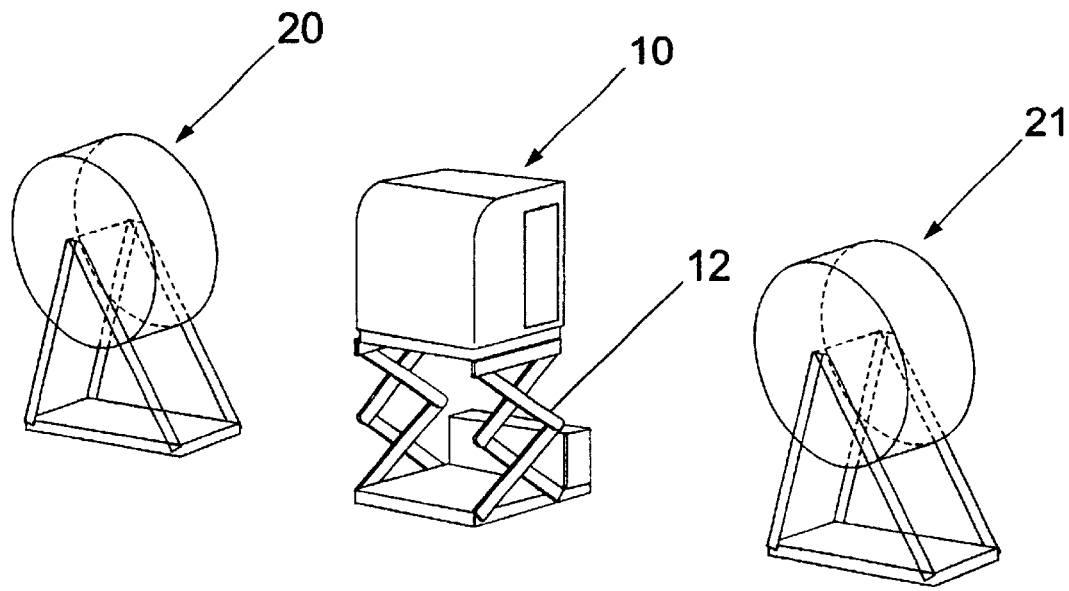
Figure 5B:
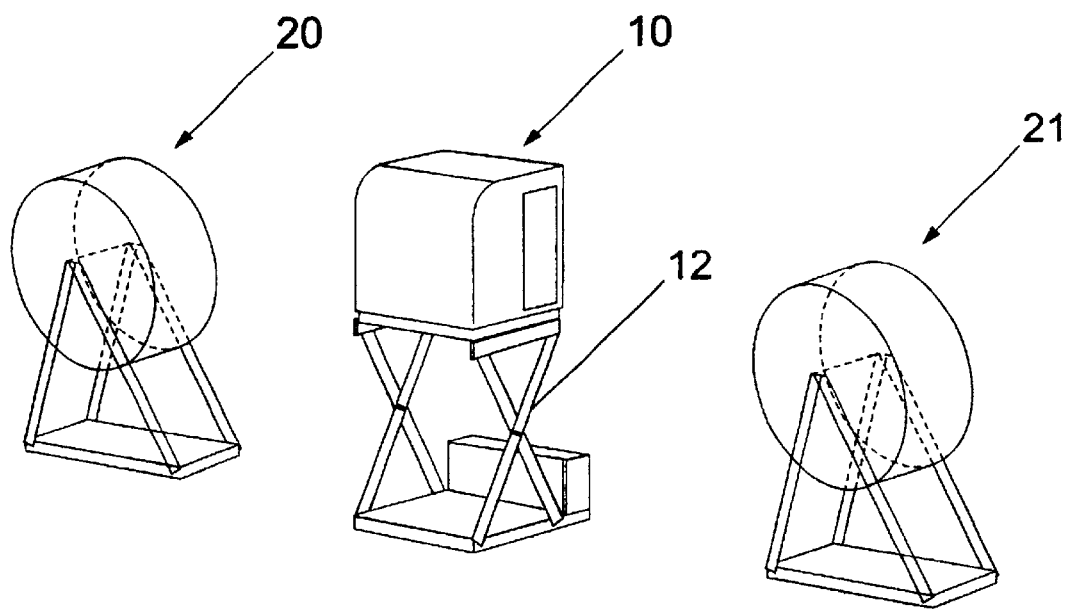
Figure 6:
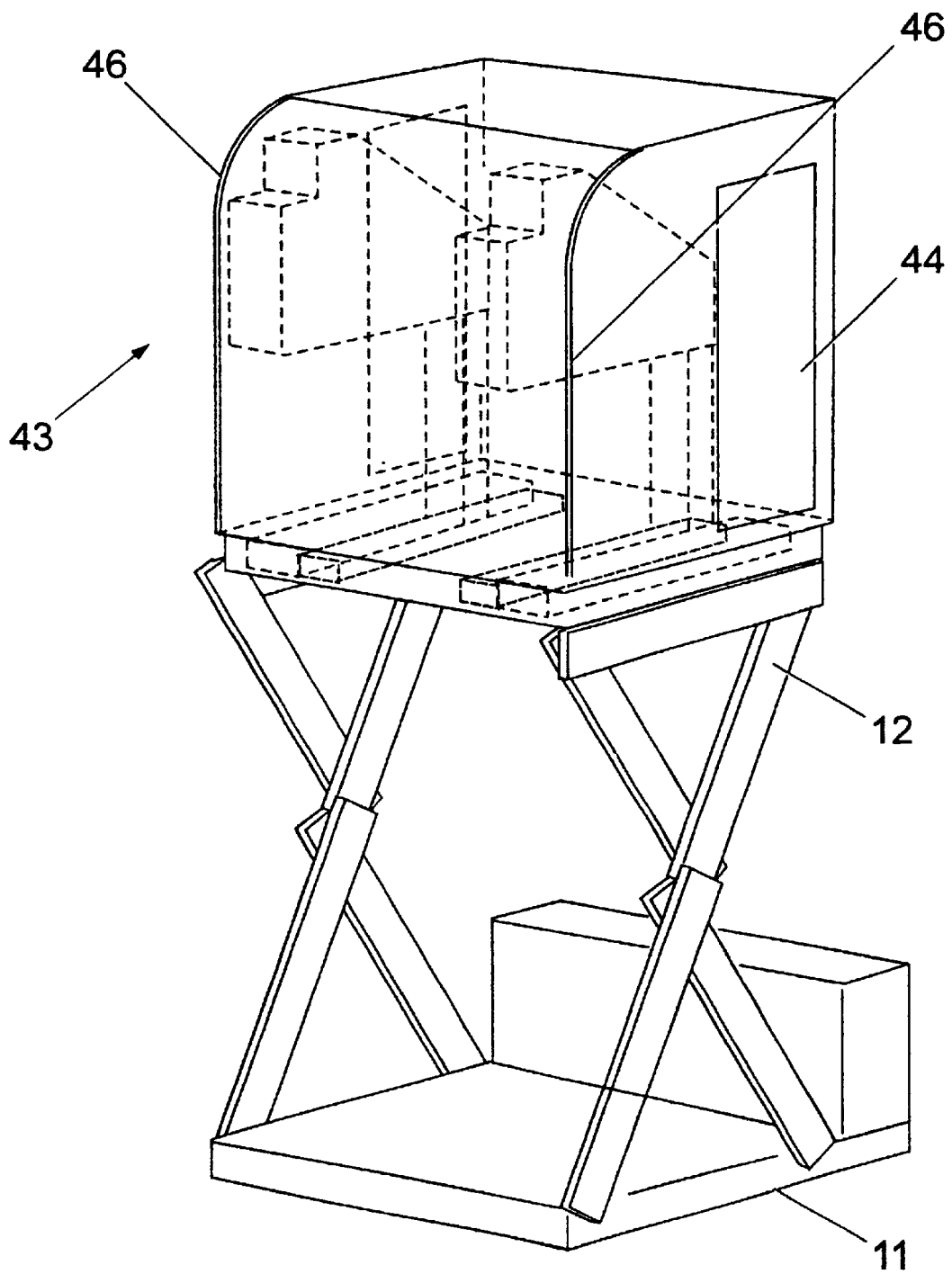
Figure 7:
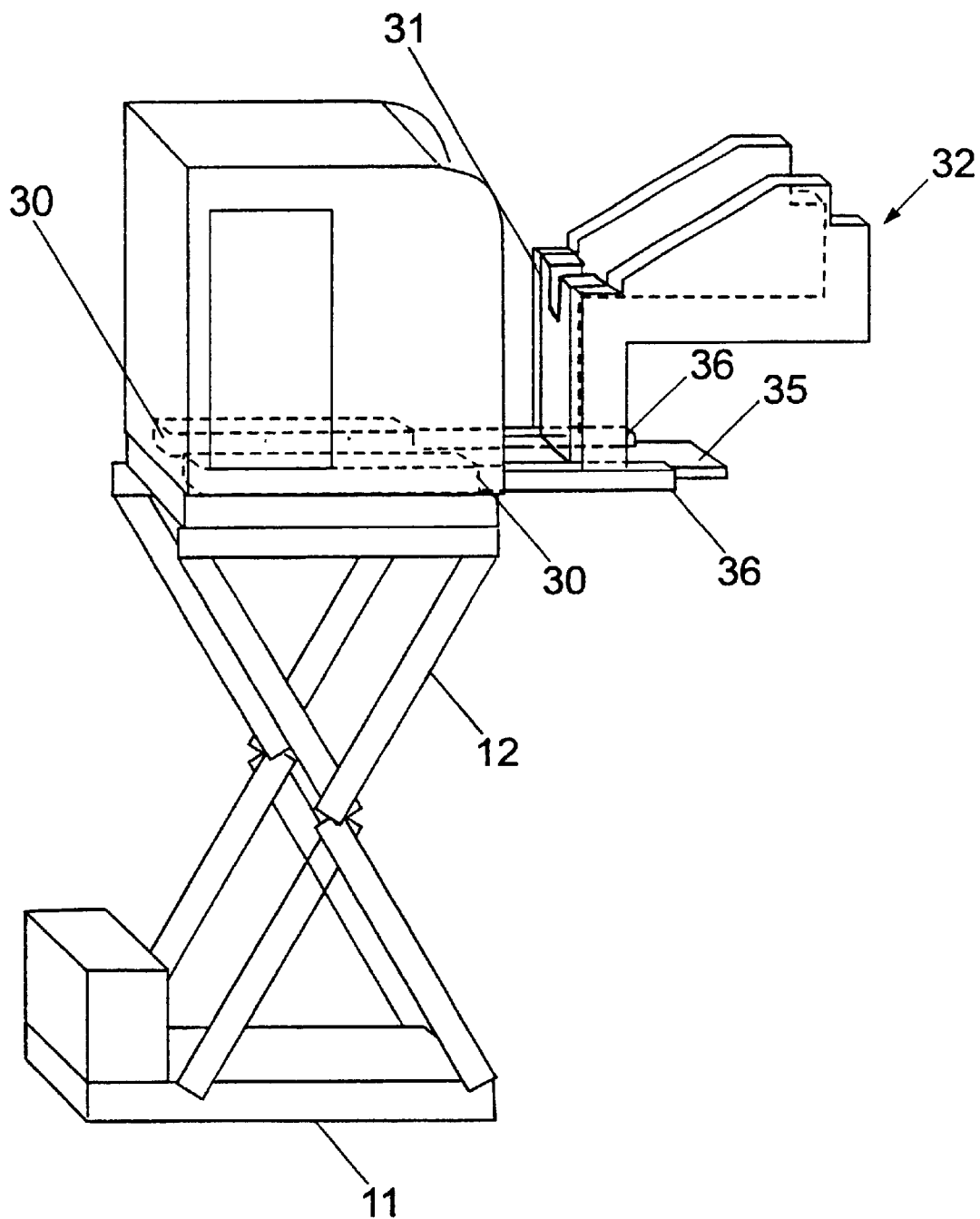
Figure 8:
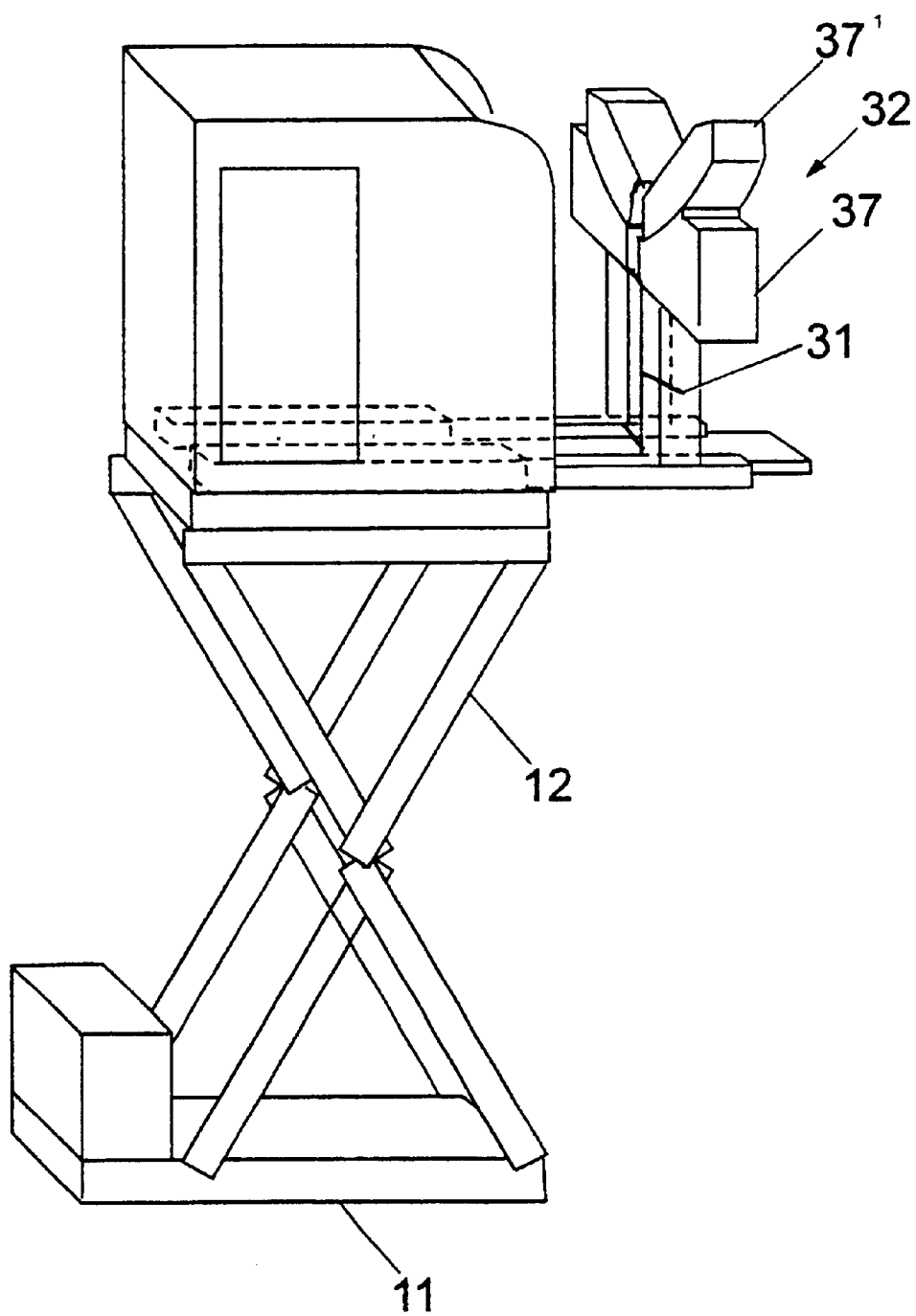
Figure 9:
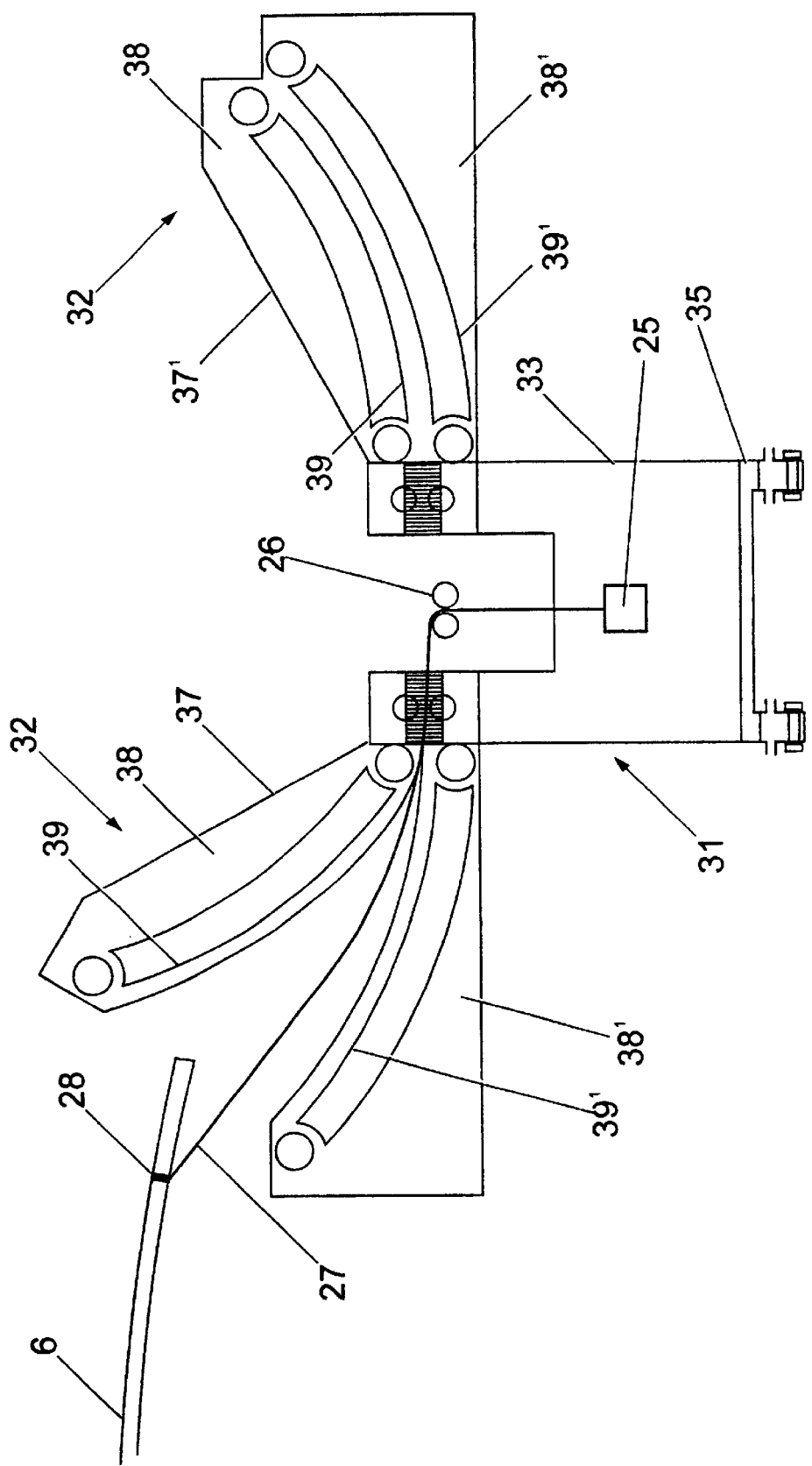
Figure 10:
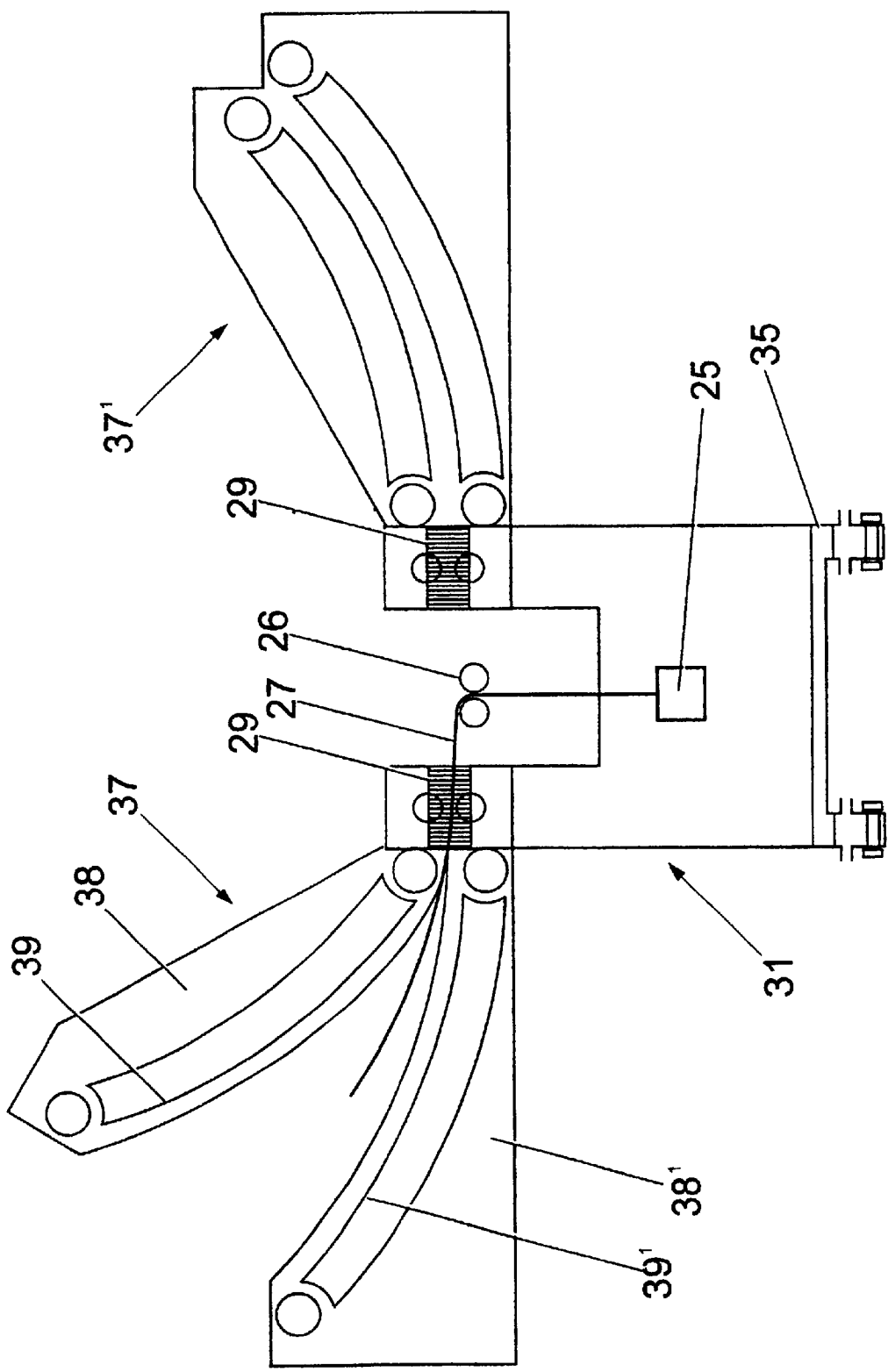
Figure 11:
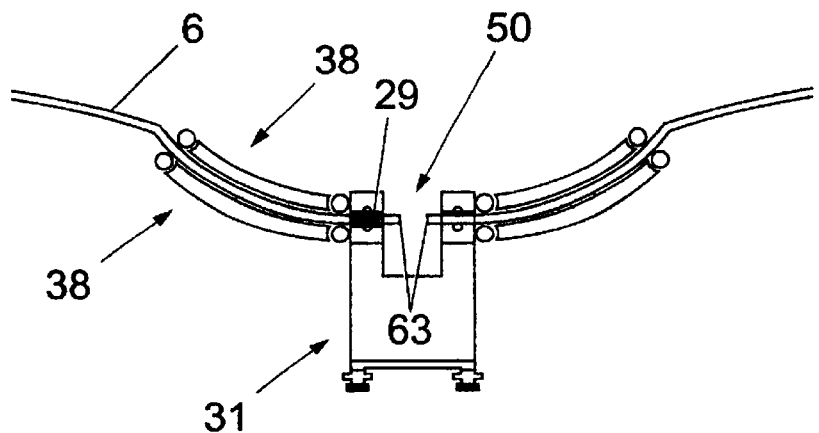
Figure 12:
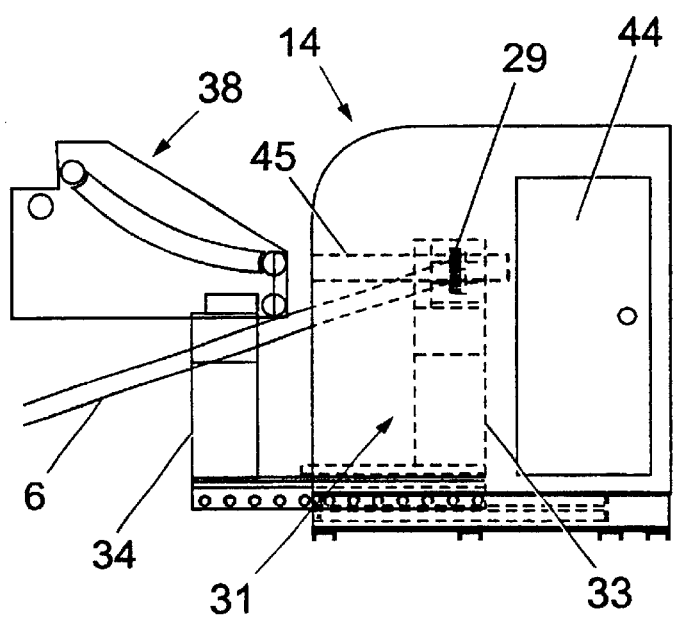
Figure 13:
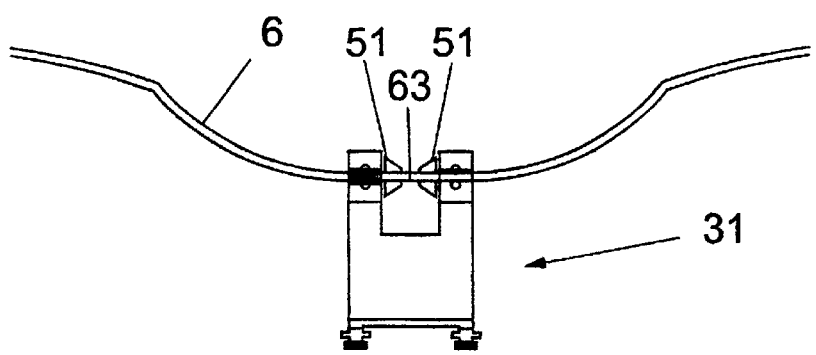
Figure 14:
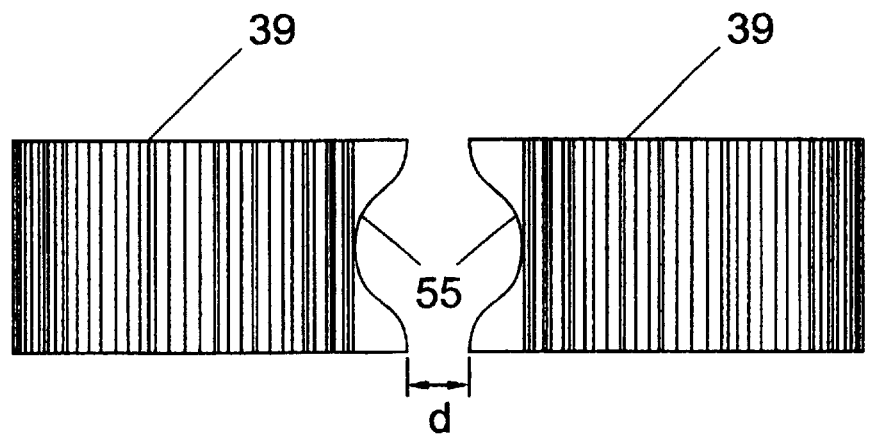
Figure 15:
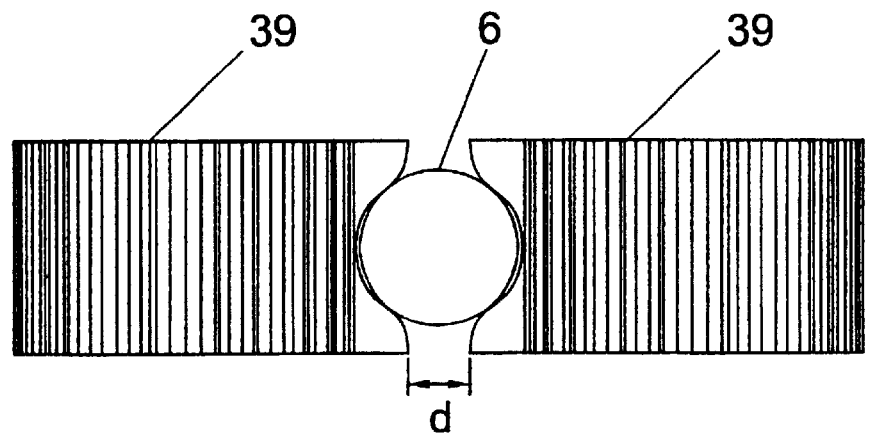
Figure 16:
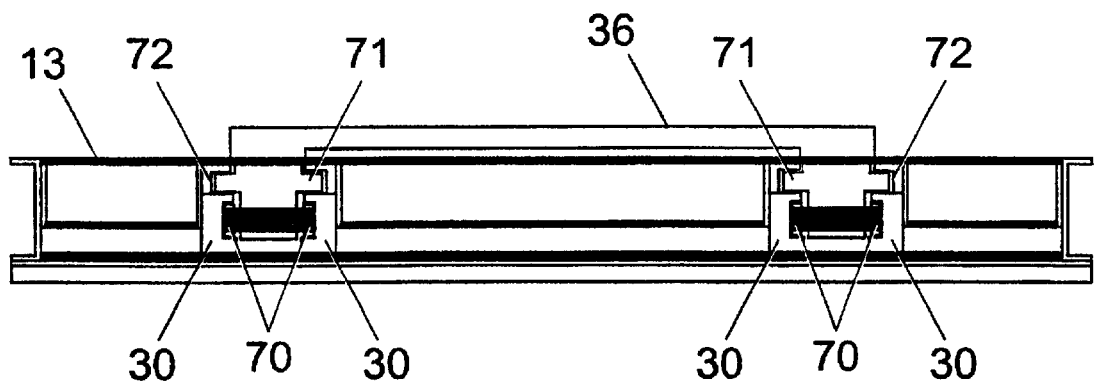
Figure 19:
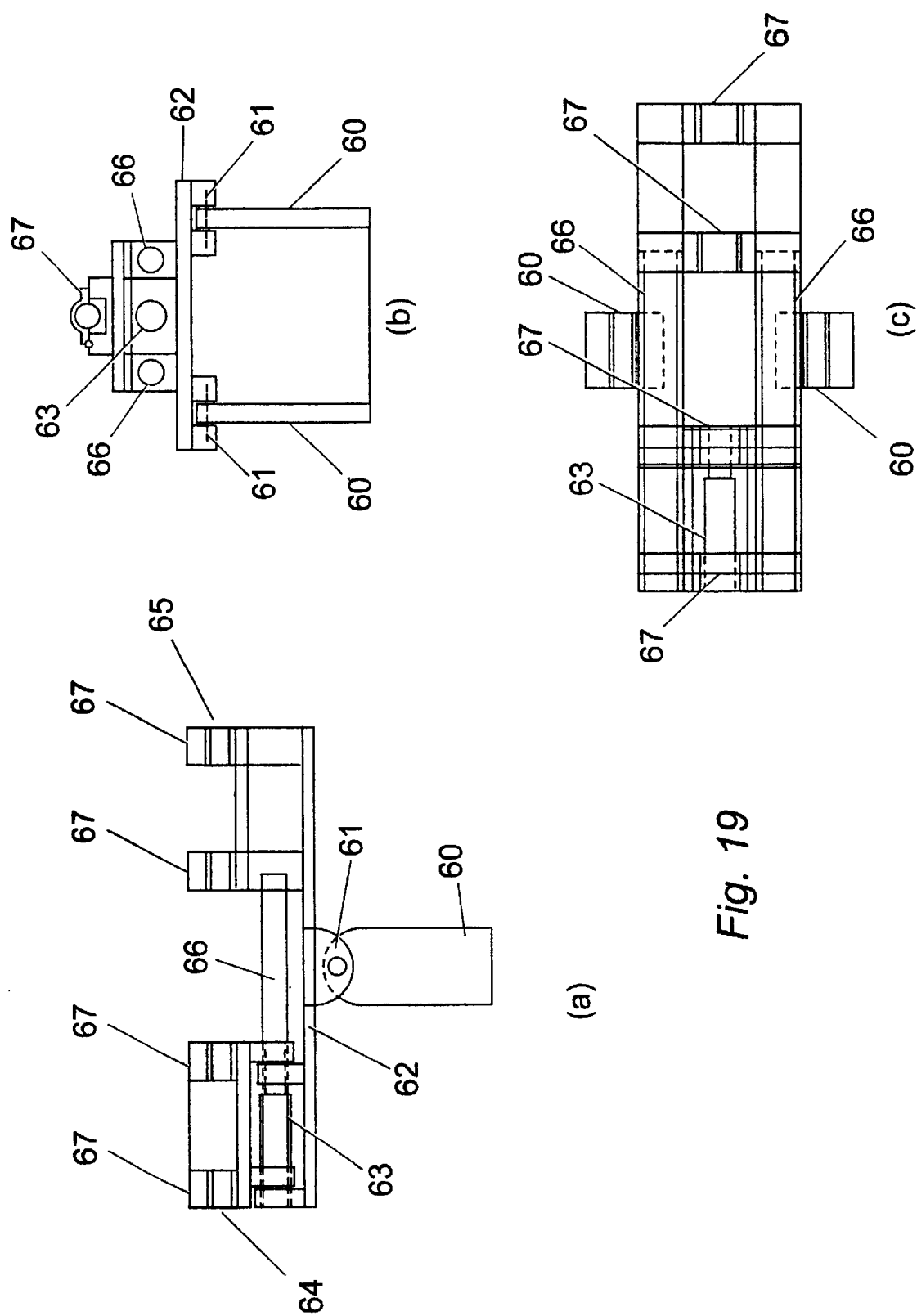

FIGS. 5(a) and 5(b) show the apparatus of FIG. 4 in relation to two reels of coiled tubing;

FIG. 6 shows the apparatus of FIG. 4 before slide out of the clamping rig and straightening stack;

FIG. 7 shows the apparatus of FIG. 4 after slide out of the clamping rig and straightening stack;

FIG. 8 shows the apparatus of FIG. 4 after rotation of the straightening stacks to bring them into mutual alignment;

FIG. 9 shows the apparatus of FIG. 4 after rotation of the straightening stacks with the jaws of one stack open to receive a length of coiled tubing;

FIG. 10 is an enlarged view of the clamping rig and straightening stack of FIG. 9;

FIG. 11 is a view of the clamping rig and straightening stack of FIG. 9 after feeding through coiled tubing from both sides;

FIG. 12 is a side view of the apparatus of FIG. 4 after clamping of the tubing and slide in of the clamping rig;

FIG. 13 is a front view of the apparatus of FIG. 4 after heat clamping of the tubing and slide in of the clamping rig;

FIGS. 14 and 15 show the profile of the drive belt and pulley without and with the tubing respectively. The spacing of the belts on each jaw can be varied to accommodate different sizes of pipes between the belts;

FIG. 16 is an enlarged view of the clamping rig bogey showing its relationship with the runners and moment beam of the platform base;

FIGS. 17(a) to 17(d) show schematically the method of straightening of a section of coiled tubing according to the invention;

FIGS. 18(*a*) and (*b*) show a front elevation and side elevation respectively of an apparatus according to a second embodiment of the invention;

FIGS. 19(*a*) to (*c*) show a front elevation, side elevation and plan respectively of the clamping apparatus of the apparatus of FIG. 18;

FIG. 20(*a*) shows the clamping apparatus of FIG. 19 in a first position, with the clamped ends of the coiled tubing spaced apart; and FIG. 20(*b*) shows the clamping apparatus of FIG. 19 in a second position, with the clamped ends of the coiled tubing brought together in a welding position.

Figure 1:
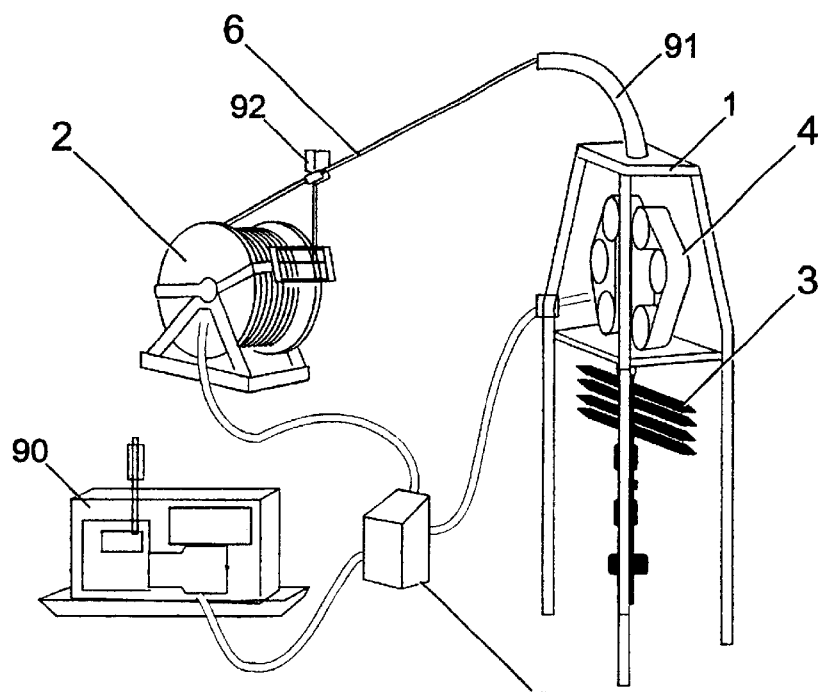
FIG. 1 is a schematic view of a prior art coiled tubing unit.
Figure 2:
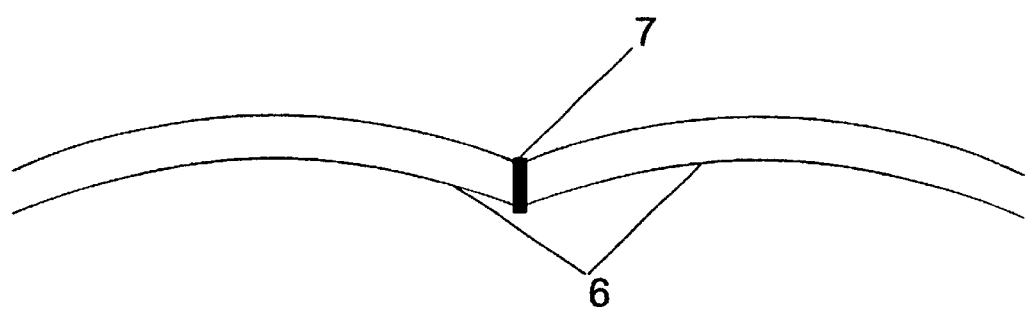
FIG. 2 is a view of a welded joint between two sections of coiled tubing.
Figure 3:
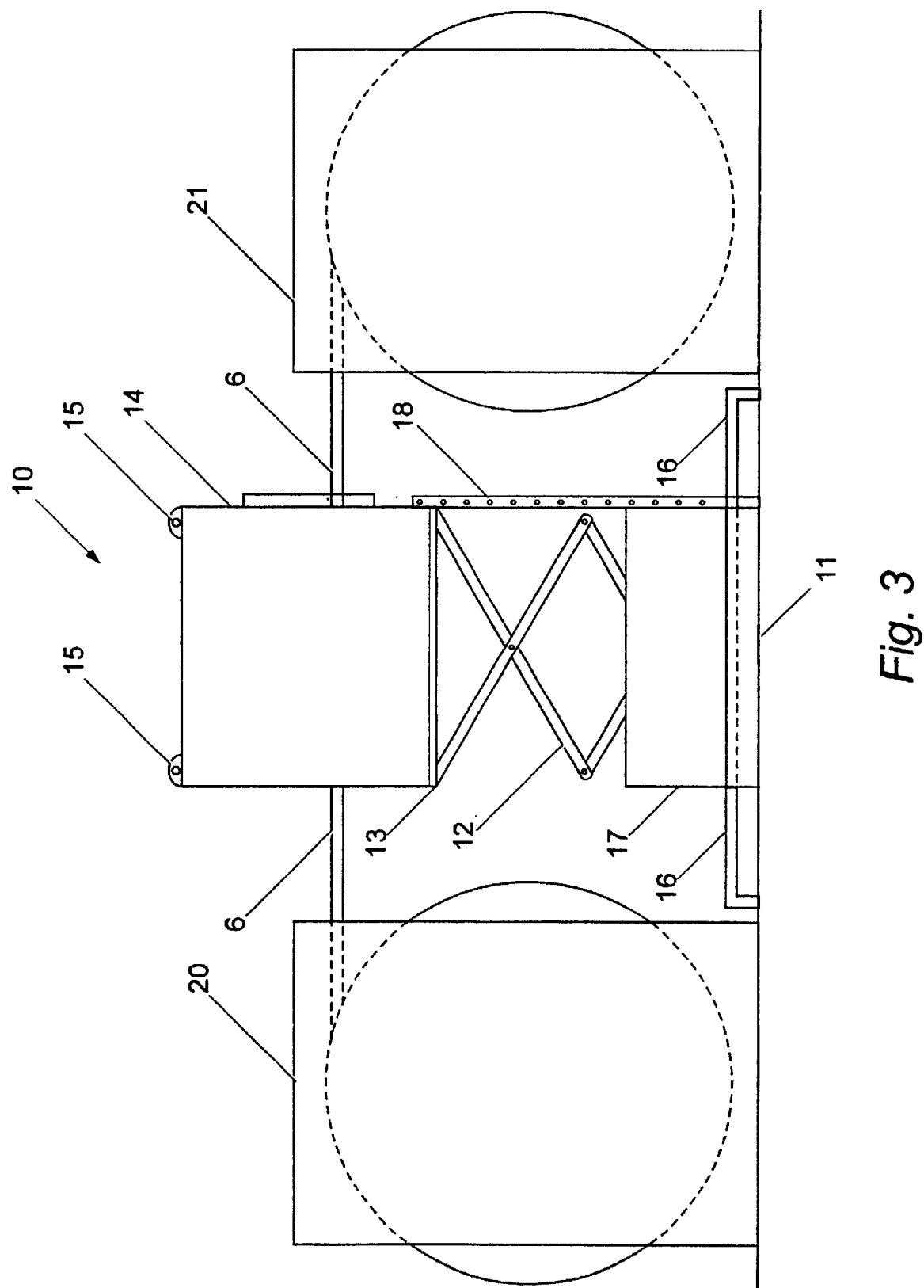
FIG. 3 is a schematic view of an apparatus according to the invention.

Referring to FIG. 3 there is shown an apparatus 10 for use in welding together sections of coiled tubing 6. The coiled tubing 6 is coiled on reels 20, 21, with the apparatus 10 being placed between the two reels 20, 21. The apparatus comprises a skid or base 11 on which is mounted a hydraulic scissor lift 12 supporting a platform base 13. Mounted on the platform base 13 is a platform shell or container 14 which contains a clamping rig and straightening stack. The rig is provided with lifting points 15 and stabilising arms 16 which may be extended to increase the stability of the rig when the scissor lift 12 is extended. The rig may include its own power supply 17 and a ladder 18 may be provided for access to the container 14 in the raised position.

Referring to FIGS. 4 to 17 there are shown details of an apparatus according to a first embodiment of the invention. The skid 11 has dimensions of approximately 3.0 m×2.4 m×0.3 m (10'×8'×1'). The skid may be constructed from rolled steel beams and steel sheet. The skid has telescopic stabilising legs 16 to provide additional operating stability. The skid supports the bearing housings for the scissor lift bearings, the electrical generator/drive motor 17, battery pack, hydraulic unit, cable/pipe drums, a telescopic ladder 18 to the platform and all other necessary electrical and hydraulic equipment required for the rig to operate. The electrical cable and hydraulic piping is fed to the platform base 13 from the skid 11 via drums to allow for the vertical movement of the platform base in relation to the skid 11. The skid, in short, supports any equipment which does not have to be on the rig platform 13 itself.

The scissor lift 12 is an off the shelf item and is mounted on the skid 11. The scissor lift 12 is selected to provide the appropriate travel and load capacity, such that the platform shell 14 and all the equipment contained therein can be lifted to the appropriate level at which welding operations are to be carried out.

The approximate dimensions of the platform base 13 are 2.4 m×2.4 m (8'×8'). Like the skid it may be constructed from rolled steel beams and steel sheet. The platform base houses the runners 30 for the clamping rig and straightening stack bogeys 35, 36. The bogeys are provided with support means such as wheels 70 which are guided along the runners 30, as seen in FIG. 16. The bogeys are of sufficient length so that a portion of the bogey may project beyond the end of the runners while the rest of the bogey is still guided by the runners. The clamping rig 31 and straightening stack 32, which are positioned at the projecting end of the bogey, are thus able to roll out beyond the edge of the platform base.

The platform base 13 also supports the beam housing 72 for the bogey moment beam 71. The beam housing 72 is a rectangular slot situated above the runner housing 30 to which the induced bending moment from the cantilevered operation of the clamping rig and straightening stack is transferred by means of a moment beam 71 connected to the bogey 36. The runner 30 and beam housing 72 form a load bearing member of the platform base 13.

The hydraulic line and power cable are fed from the skid 11 into the rear of the platform base 13 where they feed onto a further pair of drums (not illustrated). These drums then feed the hydraulic line and power cable to the clamping rig 31 and straightening stack 32 in the area below the runner and beam housing, feeding to one side and returning from the other. The platform shell 14 is bolted directly onto the platform base 13.

The platform shell or container 14 is approximately 2.4 m×2.4 m×2.4 m (8'×8'×8') in size and is formed from sheet steel on three sides 40, 41, 42, the fourth side 43 being a shutter which lifts to allow the clamping rig 31 and straightening stack 32 to roll beyond the platform base 13. The shell has a door 44 on each side of the base to allow two means of entrance and exit from the platform and has a narrow slot 45 (seen in FIG. 12) cut on each side 40, 42 of the shell to allow the coiled tubing to pass through the unit for the purposes of the welding operation. The shell may be lit internally by fluorescent lighting and may also contain dark room lights for film processing. The shell houses the weld inspection equipment, the control panel for the clamping rig and straightening stack (controlling the movement of the clamping rig and straightening stack, the operation of the clamping rig and straightening stack and the control of the cooling air supply to the heat clamps) and provides a dry, well lit, temperature controlled environment for the welder. The air inside the platform shell may be circulated and filtered to provide clean air for the welder.

The weld inspection equipment (e.g. X-ray, ultrasonic, eddy current) contained within the unit allows the weld inspector to inspect the weld in situ, immediately after completion of the welding. If required, e.g. for X-ray inspection with the presence of a radioactive isotope, safety for this procedure is achieved by the use of inter-locks on the doors, by visible and audible warnings, and by containing the weld and X-ray head within a lead or tungsten collimator. After the X-ray has been taken the film may then be processed within the unit using a compact auto-processor, the unit doubling as a dark room. The unit may include a light box for viewing the processed film.

The shell can also house heat treatment equipment for heat treating welds after the welding process, as well as other ancillary inspection equipment.

The clamping rig 31 and straightening stack 32 are powered by hydraulic motors which drive belts which grip the tubing. The clamping rig and straightening stack move out beyond the edge of the platform base as previously described, where the arms of the straightening stack fold out and the unit performs the straightening operations.

The following sequence of actions describes how the unit typically operates:

1. The rig 10 is positioned between the two reels 20, 21 of coiled tubing to be joined as shown in FIG. 5(*a*).
2. The rig rises on hydraulic scissor legs 12 to the level of the coiled tubing 6 as it spools off the top of the drum 20, 21 as shown in FIG. 5(*b*).
3. The shutter on the operating side 43 of the rig is opened. FIG. 6 shows the shutter in the open position so that the operating side 43 between the shutter guide tracks 46 is open.
4. The tubing straightening stack 32 and clamping rig 31 roll out beyond the edge of the rig platform, on bogeys 35, 36 mounted on runners 30, as shown in FIG. 7. The bogeys 35, 36 are separate, so that the bogey 35 supporting the clamping rig 31 may be slid back onto the platform base 13 while the bogey 36 supporting the straightening stack 32 remains cantilevered beyond the edge of the platform base 13. The independent operation of the bogeys 35, 36 may be achieved by mounting one bogey 35 on top of the other bogey 36, or by mounting the clamping rig bogey 35 on separate runners 30 positioned inside the runners 30 used by the straightening stack bogey 36.

5 The tubing straightening stack 32 comprises two straightening arms 37, 37' which rotate about a vertical pivot axis, so that the stack folds open and each arm 37, 37' is aligned with the tubing 6 as it is pulled off the drum as shown in FIG. 8. It is possible that the straightening stack 32 may comprise only one arm 37, if it is not necessary to straighten coiled tubing 6 on both sides of the connection.

6 The end of the tubing 6 on the first reel 20 is now attached to a wire 26 by means of a clamp 28. The wire 26 passes over a pulley 27 to a powered winch 25 which is incorporated in the clamping rig 31. The winch is operated to drag in the coiled tubing 6 between the jaws 38, 38' of one of the arms 37 of the straightening stack 32, as shown in FIG. 9.

7 The jaws 38, 38' of the straightening stack 32 hinge open to allow the tubing to be more conveniently fed into the stack, as shown in FIG. 10.

8 The jaws 38, 38' (shown schematically in FIG. 11) are closed around the tubing 6 which is then driven through the straightening stack 32 and the clamping rig 31, emerging in the clamping area 50. Each jaw 38, 38' comprises a drive belt 39, 39' which is arranged to have an arcuate form, with a curvature which is opposite to that of the tubing. Hence as the tubing 6 is driven through the jaws it is deformed elastically then plastically such that the curvature is reversed. When the tubing emerges from the jaws there is an elastic relaxation, resulting in the tubing in the clamping area 50 being linear, as shown in FIG. 11.

Figure 17:
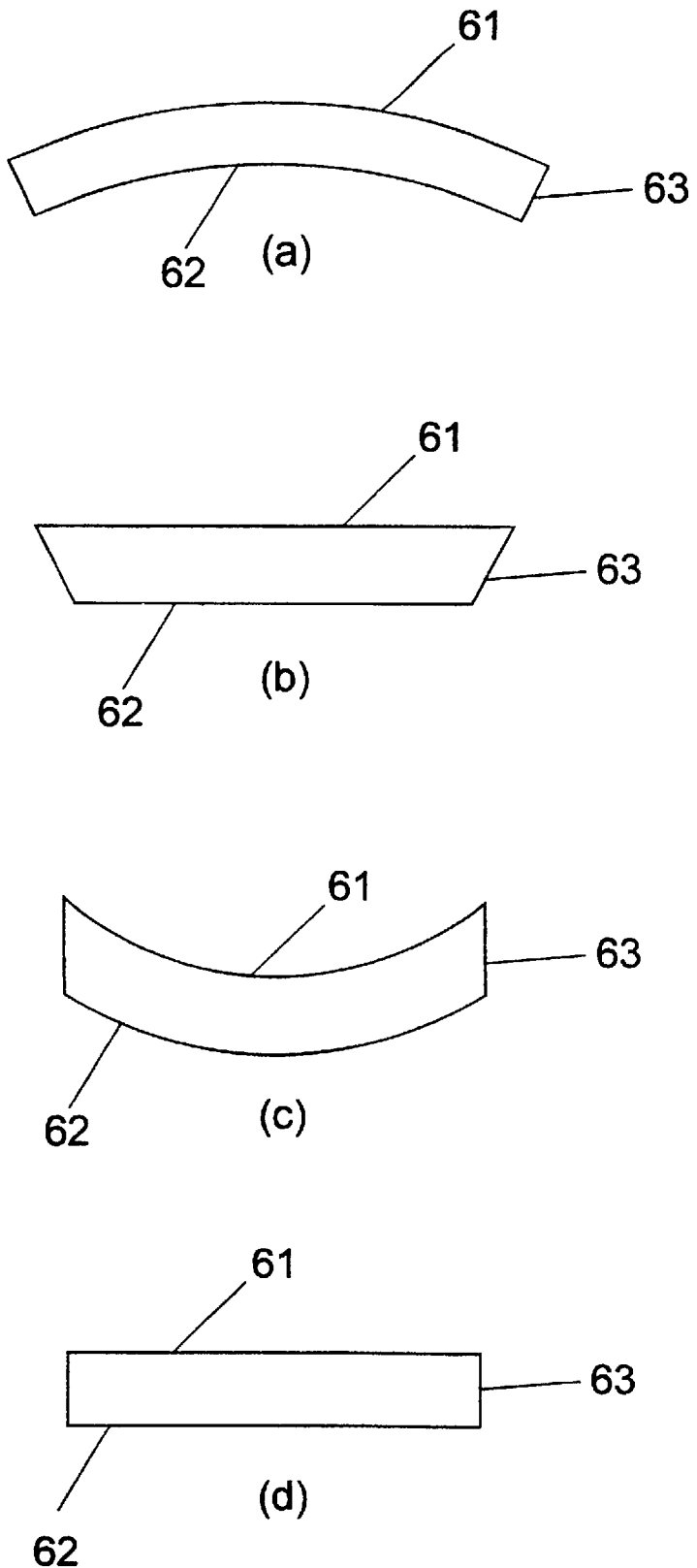

FIGS. 17(*a*) to (*d*) show how the coiled tubing is deformed by the straightening stack. FIG. 17(*a*) shows the tubing in its coiled form on the reel. The upper side 61 has been plastically deformed during the reeling operation so that even after unreeling it is longer than the lower side 62 of the coil. If the tubing is straightened elastically as in FIG. 17(*b*), the fact that the upper side 61 is longer means that the end 63 of the tubing is not square and welding a connection is difficult. According to the invention the reverse bending effected by the straightening stack results in permanent plastic elongation of the lower side 62 of the tubing (see FIG. 17(*c*)), so that, after passing through the jaws to the clamping area, on elastic relaxation the upper and lower sides 61, 62 are of equal length and the end 63 of the tubing is square.

9 Steps 6 through 8 are then carried out for the second tubing reel 21 on the other side of the rig.

10 The jaws 38, 38' on both arms 37, 37' of the straightening stack 32 then open again releasing the tubing 6 which is now held by clamps 29 in the clamping rig 31.

11 The clamping rig 31 and the straightening stack 32 now separate. The clamping rig, with clamps 29 gripping the tubing 6, moves inside the rig platform on the clamping rig bogey 36, while the straightening stack 32 remains external. The shutter of the container 14 closes after the clamping rig has moved inside, as shown in FIG. 12. The slot 45 in the side of the container 14 allows passage of the tubing 6 whose end is clamped in the clamping rig 31, when the clamping rig moves inside the container 14. The ends 63 of the tubing are prepared for welding, e.g. by grinding.

12 The tubing 6 is now driven by the clamping rig 31, whose clamps 29 accommodate driving movement, until the two ends 63 are close enough to weld.

13 The heat sink clamps 51, which are designed to remove heat from the welded area of the tubing 6, are closed around the protruding ends of the tubing, as shown in FIG. 13.

14 The tubing is welded together.

15 The weld inspection using X-ray equipment is carried out inside the rig platform. The processing of the film and viewing of the processed film are also carried out in the container 14.

16 The weld is inspected, the shutter is opened, the clamping rig 31 moved outside the rig platform 14 and, if the weld is found to be satisfactory, the tubing 6 is released from the clamping rig 31.

17 in the situation where the weld is not satisfactory the tubing 6 is cut and the procedure recommences from step 12.

The procedure of steps 6 to 8 can be automated. The operator selects the diameter, thickness and material properties of the coiled tubing to be straightened. The clamping force and driving force applied by the belts 39, 39' on jaws 38, 38' is then calculated automatically, and sensors ensure that the correct clamping force is maintained and that the tubing is pulled through the straightening jaws at the correct rate. Although the FIGS. 9 and 10 show the jaws of the straightening arm being hinged, they may be separated by other means, such that they move in parallel relation to one another. In particular their separation may be variable to accommodate different size pipes. FIGS. 14 and 15 show opposing belts 39 and 39' in end view. The drive surface of each belt has a concave shape 55 in the transverse direction, such that the belt can accommodate tubing 6 of different diameter. The smaller the diameter of the tubing 6, the smaller will be the spacing d between opposing belts 39, 39'.

Referring to FIGS. 18 to 20, there is shown an apparatus according to a second embodiment of the invention. The apparatus functions in a similar way to that shown in FIG. 3, with the skid base 11 being placed in position and stabilised by stabilising legs (not shown). Like components have the same reference sign. The container 14 is raised on the scissor legs 13 to the desired level between the reels 20, 21. In the second embodiment the enclosed container 14 has a vertical tubing slot 45*a* in each side wall and a corresponding slot 45*b* in the roof.

The end sections 80, 81 of the coiled tubing from the reels 20, 21 are drawn in under tension by the winch motor 70 and drum 71, through the side slots 45*a*. The winch cable 27 is attached to the ends 82, 83 of the CT by way of a modified connector (not shown). The end sections 80, 81 of the tubing are located and fixed in the clamps 67 of the clamping unit 72.

The clamping unit 72 is fixed within the container 14 and comprises two support legs 60 mounted on the platform base 13. A clamp base 62 is pivotally mounted by hinges 61 to the support legs 60. At one end of the clamp base 62 there is fixed a static clamp assembly 65, having two hydraulically operated clamps 67. At the other end of the clamp base 62 there is fixed a drive ram 63 which operates a moving clamp assembly 64, having a further two hydraulically operated clamps 67. The moving clamp assembly 64 is restrained to move along one axis by guides 66 which engage with the static clamp assembly 65.

The static clamp assembly is adjustable, allowing movement of the clamped CT section 81 in two directions perpendicular to the tubing axis and permitting accurate alignment of the tubing ends. The hinge 61 allows the joining of tubing which passes through the unit at an angle to the horizontal. Tubing of different sizes can be clamped using various shoe inserts (not shown) which fit into the clamps 67. The shoes have a semicircular cross section and so can be split to release the joined tubing string on completion of the weld.

In operation the connectors (not shown) are removed from the ends 82, 83 of the coiled tubing, and the ends 82, 83 are prepared for welding, either manually or by an automatic weld preparation tool (not shown). The moving clamp assembly 64 can then be moved in the longitudinal direction of the tubing so the ends 82, 83 are "mated up" for the joining operation.

The welding operation is carried out by butt welding manually or by creating an automated orbital weld. The automated orbital weld is the most desirable method of joining tubing and will therefore be the method used in most situations.

The inspection and automated diagnosis is then carried out within the container, using any suitable manual or automated method of inspection, such as by X-ray, ultrasound or eddy current measurement. The inspection equipment may also be used for the continuous inspection of the tubing string as opposed to simply inspecting just the butt weld.

If the weld fails the QA inspection, the welded portion of tubing can be cut out of the string while the CT is still held by clamps 67, so that the appearance is as in FIG. 20(*a*). After preparation of the ends, the moving clamp assembly 64 then brings the two recut ends into the weld position of FIG. 20(*b*) and the welding operation can be performed again; this can be done with minimal time delay.

After satisfactory completion of the weld, the unit is lowered on the scissor legs, the joined CT string emerging from the slot 45*b* in the roof of the unit. The slots 45*a* and 45*b* are preferably provided with resilient sealing means such as opposing stiff rubber or synthetic flaps or diaphragms which project from each side, so that the slot reseals around the tubing as the tubing passes through the slot.

The method afforded by the present invention offers significant advantages over the prior art methods. In particular, the fact that welding and weld inspection can be carried out in a sealed environment enables the achievement of superior weld quality. It makes possible the use of enhanced inspection techniques, which would not be practicable using prior art methods of joining coiled tubing.

There is no need for scaffolding and therefore the associated expenditure and cost in lost time are negated.

After the welder has completed his task and because the weld is contained in a sealed environment, the container can be used to carry out the Q.A. Inspection immediately, with no delay.

A further advantage arises in the fact that the butt weld between the two strings of CT can be performed under conditions of relatively high tension in comparison to the current tensile loading of the tubing; this has a straightening effect on the tubing, resulting in improved physical properties of the weld and the tubing adjacent to the weld.

Within the container there may be housed X-Ray inspection equipment and a facility to process the radiographs of the weld automatically, and to view the results.

The prior art system employs Gamma Radiography using a portable Iridium 192 Isotope which is expensive, time consuming and of an inferior quality to the X-Ray Radiography, which may be used in the present invention. Gamma Radiography requires barriers to be placed in order that access to the pipe deck and rig floor is prohibited, because of the risks of radiation. Other operations on the deck have to cease while the weld inspection takes place. In contrast the method of the invention is much safer. The whole process takes place in an enclosed unit, and other activities can continue simultaneously on the pipe deck and rig floor.

In the offshore environment, the joining of two sections of coiled tubing according to the method of the invention can be finished within three hours, from start to finish. This compares with a typical time of 15 hours taken by prior art methods, which have to include the following steps:

1 Build Scaffold
2 Set up coiled tubing for welding
3 Weld joint
4 Set up for Radiography, eg permits, barriers, warnings prior to start
5 Carry out radiography and remove equipment from area eg IR192 Isotope
6 Manual developing of film and interpretation of film
7 Stripdown of scaffolding, provided weld has passed stringent Q.A. procedures The invention enables users of coiled tubing to have confidence in welded joints in coiled tubing, since the reliability of welds in coiled tubing is enhanced. Presently there is little confidence in welded joints in coiled tubing, and they are prone to failure.

The method of the present invention can accommodate other inspection methods. As improved inspection methods are developed, equipment required for these methods may be installed in the unit according to the invention. The method may include continuous inspection of the coiled tubing, for example by electromagnetic inspection techniques.

It should be noted that any features of the embodiment of FIGS. 18 to 20 may be combined with any features of the embodiment of FIGS. 4 to 16.

These and other modifications and improvements can be incorporated without departing from the scope of the invention.

What is claimed is:

1. A portable unit for on-site welding of sections of coiled tubing comprising a container for carrying out welding operations therein, a tube clamping rig located inside said container and adapted to clamp two sections of tubing in abutting end to end relationship, and welding apparatus; said container having a roof, two opposing side walls and at least one door therein; wherein said tube clamping rig is adapted to hold and move a first one of said sections of tubing axially into abutting end to end relationship with a second one of said sections of tubing, and wherein said tube clamping rig comprises:

a first moveable clamp assembly adapted to hold and move said first one of said sections of tubing axially into abutting end to end relationship with said second one of said sections of tubing; and a second clamp assembly adapted to hold said second section of tubing.

2. A unit according to claim 1, wherein each of said opposing side walls has a slot therein, each of said slots being adapted to allow the passage of a tube extending through said wall and clamped by said tube clamping rig, such that said tube may move relative to said container.

3. A unit according to claim 2, wherein said slots are substantially horizontal and extend to an opening in an end wall of said container.

4. A unit according to claim 2, wherein said slots are substantially vertical and extend to a further slot provided in said roof.

5. A unit according to claim 1, further comprising means for adjusting the height of said container.

6. A unit according to claim 1, further comprising a clamping rig guide means adapted to guide the tube clamping rig between a first position outside the container and a second position inside the container.

7. A unit according to claim 1, further comprising a winch adapted to pull the tubing towards the tube clamping means.

8. A unit according to claim 1, further comprising a tube straightening means.

9. A unit according to claim 1, further comprising a weld inspection means.

10. A unit according to claim 1, wherein said welding apparatus is an automatic welding apparatus.

* * * * *

UNITED STATES PATENT AND TRADEMARK OFFICE
CERTIFICATE OF CORRECTION

PATENT NO. : 6,220,498 B1  
DATED : April 24, 2001  
INVENTOR(S) : Gordon et al.

Page 1 of 1

It is certified that error appears in the above-identified patent and that said Letters Patent is hereby corrected as shown below:

Column 10, claim 1  
Line 58, should read: -- a second fixed clamp assembly adapted to hold said second --

Signed and Sealed this

Nineteenth Day of February, 2002

Attest:

JAMES E. ROGAN  
*Attesting Officer*     *Director of the United States Patent and Trademark Office*